Patented Apr. 6, 1943

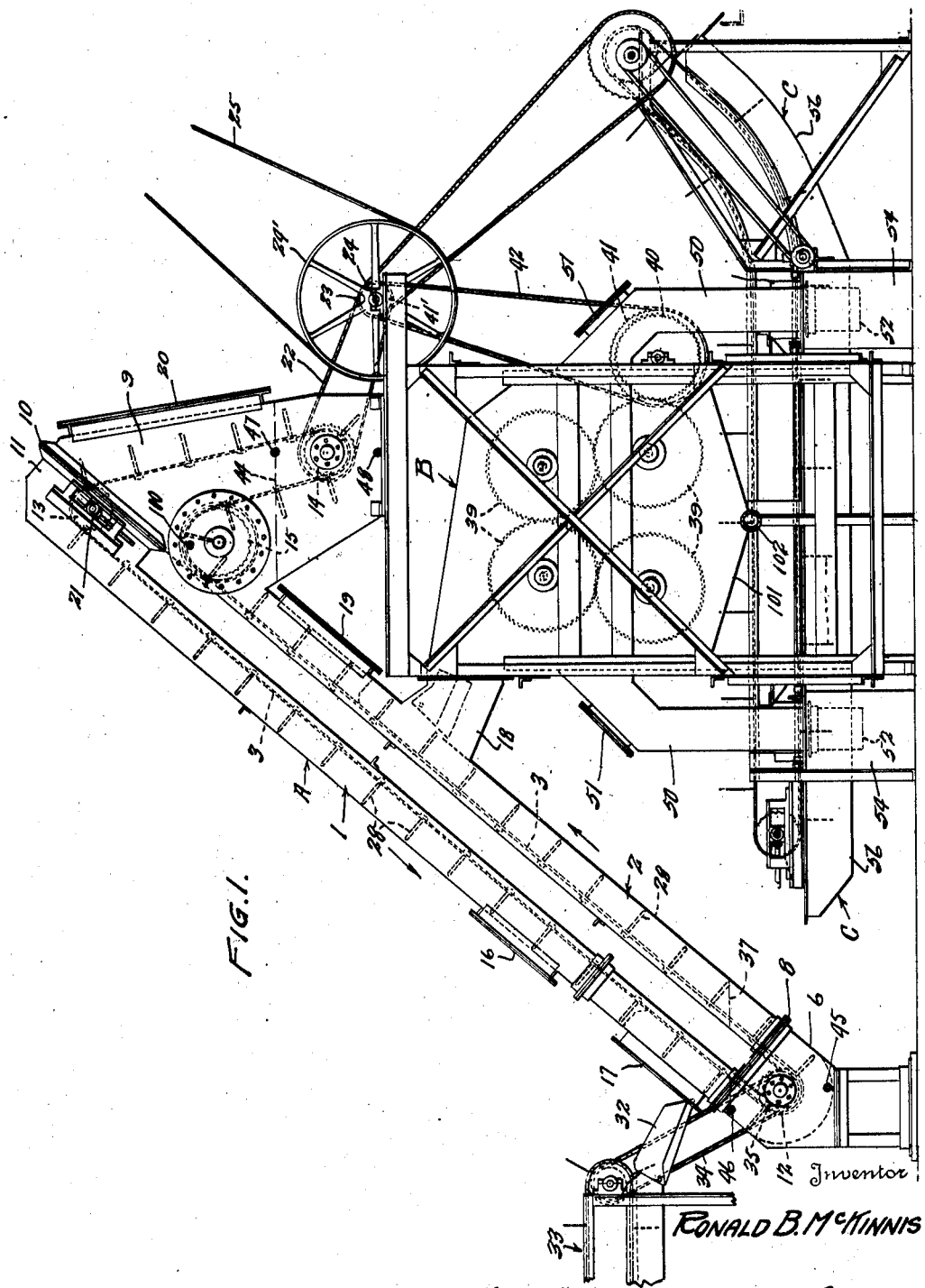

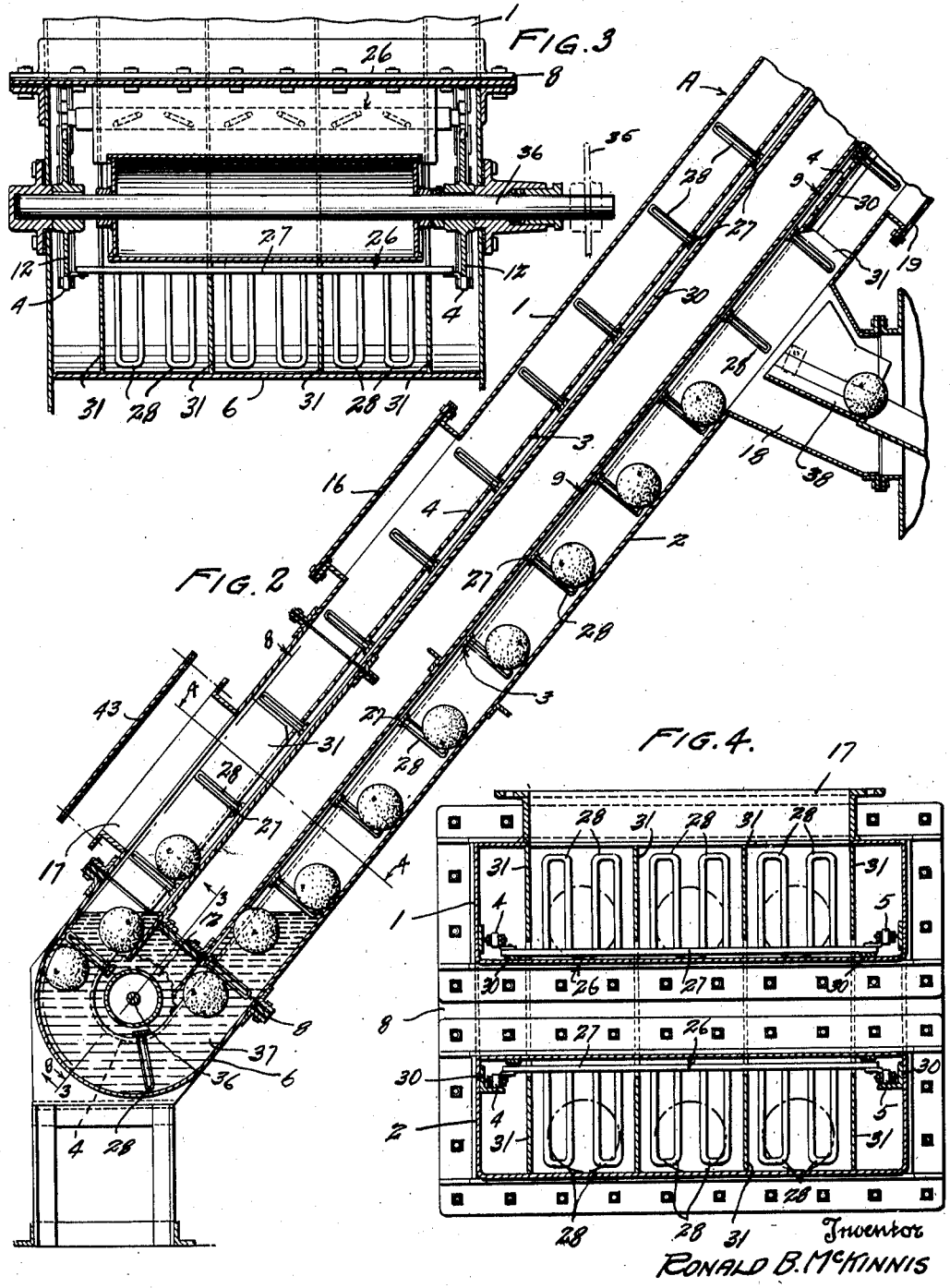

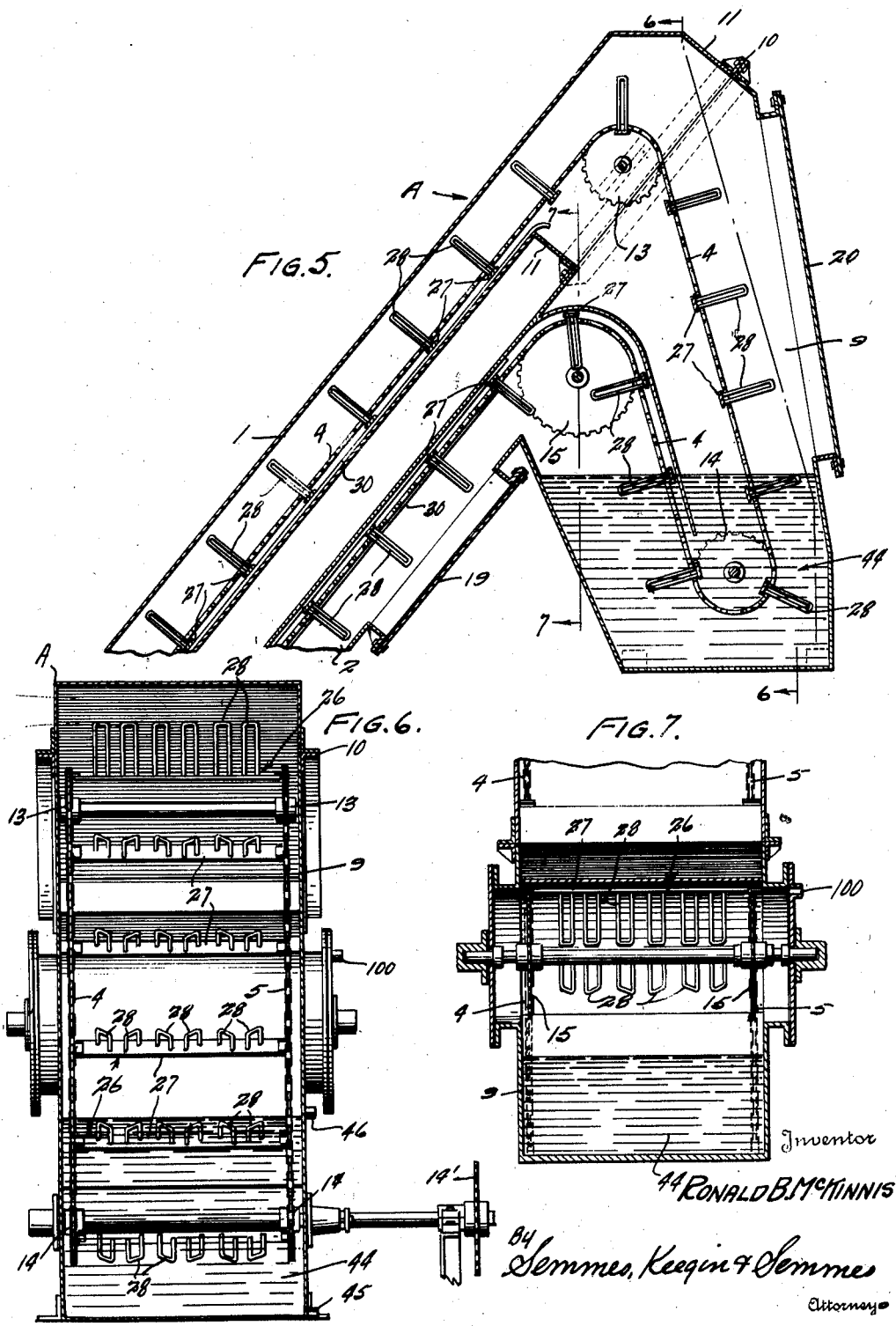

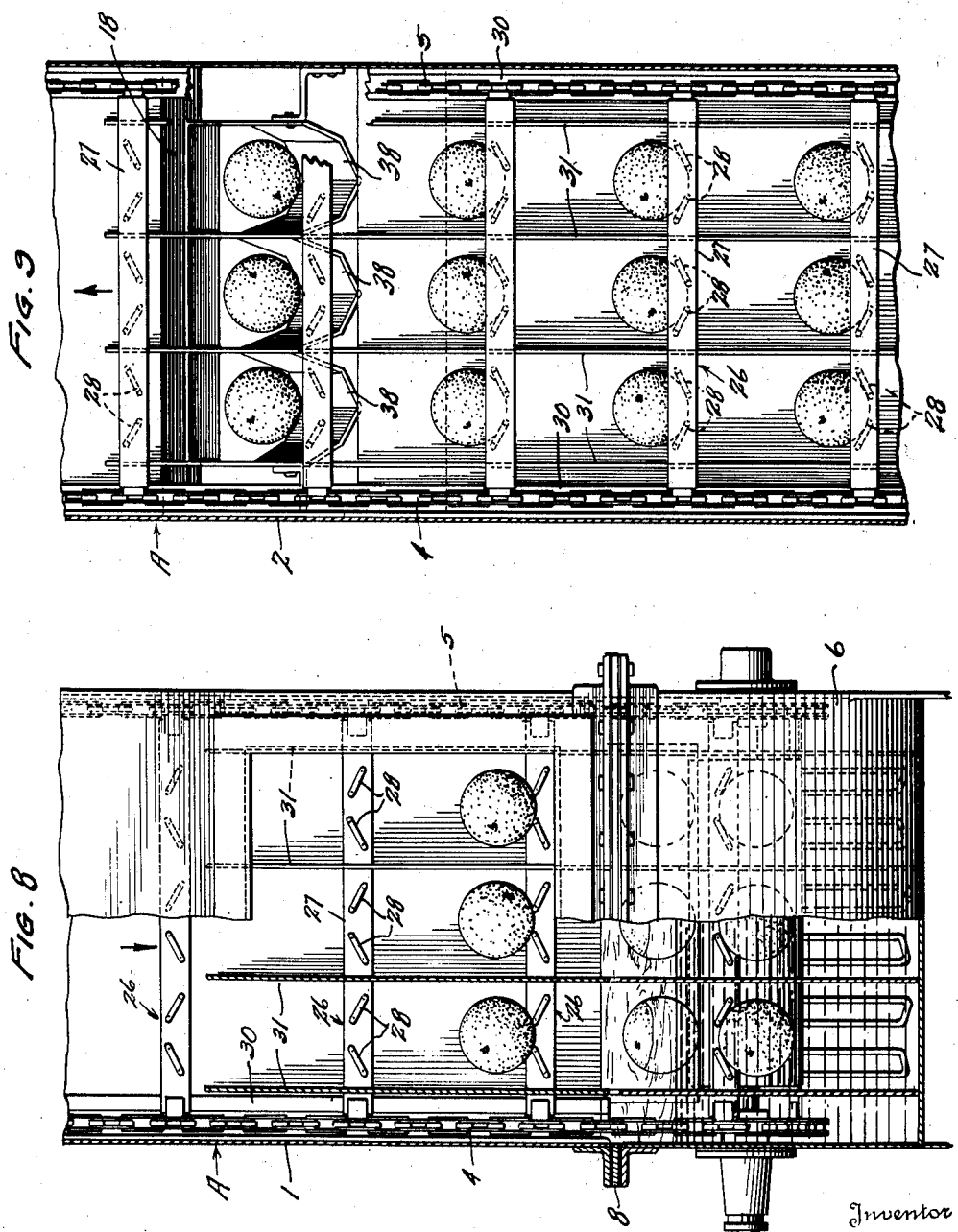

2,316,094

UNITED STATES PATENT OFFICE 2,316,094

APPARATUS FOR TREATING FOODS

Ronald B. McKinnis, Winter Haven, Fla., assignor to Sunshine Foods Inc., Winter Haven, Fla., a corporation of Florida Application October 7, 1939, Serial No. 298,464

7 Claims. (Cl. 214—17)

My invention relates to apparatus for extracting fruit and vegetable juices. It is particularly applicable to the extraction of juice from citrous fruits, but has application to other fruits, as well as vegetables.

An object of the invention is to provide an apparatus which is simple to construct, easy to repair and replace, and which prevents access of oxygen to the extracted juices at any point in the process.

A further object of the invention is to provide an input or delivery conveyor which is simple in construction, and which is completely efficient in barring the access of oxygen to the extraction chamber.

Yet another object of the invention is to provide a conveyor which will center the fruit delivered so that it will be delivered in the proper position for action of the cutting knives in the extraction chamber.

Still another object of the invention is to provide an output conveyor which is simple in construction, positive in operation, and which will prevent access of oxygen to the juice in the extracting chamber.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 represents my apparatus in side elevation, some of the parts being shown in dotted lines to more clearly indicate the construction;

Fig. 2 is a detail longitudinal sectional view taken through the lower part of the elevating conveyor;

Fig. 3 is a view taken along the line 3—3 of Fig. 2, looking in the direction of the arrows;

Fig. 4 is a view taken along the line 4—4 of Fig. 2, looking in the direction of the arrows;

Fig. 5 is a longitudinal sectional view showing the construction at the upper end of the elevating conveyor;

Fig. 6 is a view taken along the line 6—6 of Fig. 5, looking in the direction of the arrows;

Fig. 7 is a view taken along the line 7—7 of Fig. 5, looking in the direction of the arrows;

Fig. 8 is a view taken along the line 8—8 of Fig. 2, looking in the direction of the arrows;

Fig. 9 is a view taken along the line 9—9 of Fig. 2, looking in the direction of the arrows.

Referring to the drawings, I have shown an apparatus comprising an input elevating conveyor A, an extracting mechanism B, and a peel discharge mechanism C. The input elevating conveyor A comprises two substantially parallel tubes 1 and 2. Through these tubes is adapted to pass a flexible endless conveyor 3 which may be of any desired type. I have shown in the drawings that the conveyor is of the endless type and comprises two sprocket chains 4 and 5. The conveyor tubes 1 and 2 are joined at their lower ends by a return section of tubing 6 which is suitably attached, as indicated at 8, to the tubes 1 and 2.

At its upper end the tube 2 passes into a chamber 9 which projects downwardly from the tube 2. The chamber 9 is joined, as indicated at 10, to a downward extension 11 of the tube 1.

The chains 4 and 5 of the endless conveyor 3 pass over a sprocket 12 in the return section 6 of the conveyor tube. They also pass over sprockets 13 mounted in the section 11 of the tube 1, thence pass downwardly over sprockets 14 located in the extension 9 of the tube. From thence the conveyor passes over a sprocket construction 15.

The tube 1 is provided with an assembly hatch 16 and a hopper or feeding hatch 17. The tube 2 is provided with a discharge chute 18 which is adapted to discharge into the extracting mechanism indicated generally by the letter B. It also has an assembly hatch 19. The chamber 9 is provided with an assembly hatch 20. The conveyor can be tightened by the usual screw-tightening construction, indicated generally by the numeral 21, which is adapted to move the sprocket mechanism 13 either in an upward or downward direction to tighten the sprocket chains 4 and 5 of the conveyor.

The conveyor 3 is driven by means of the sprocket 14' through a chain drive 22 which passes over a drive sprocket 23 carried by a counter shaft 24 driven by a drive pulley 24', which in turn is driven by a belt drive 25 from a source of power (not shown).

The conveyor chains 4 and 5 carry, at spaced intervals, conveyor flights 26 which comprise slats 27 which carry upstanding fingers 28. Each slat 27 carries three pairs of the upstanding fingers 28. Each pair of fingers 28 comprises two fingers which are slanted inwardly toward each other so that the orange or other round object will be forced into a centered position within the fingers. This is important as it enables the oranges to be held in a proper position for proper feeding into the extracting mechanism. The cutting knives and the extracting mechanism in the extracting chamber are not shown, they may be of any of several known types on the market, such as the so-called Faulds rotary juice extractor. This construction forms no part of the present invention.

The slats 27 for the conveyor flights are adapted to slide on tracks 30 in their movement through the conveyor housing comprising the two tubes 1 and 2.

As has been indicated, there are three sets of pairs of fingers which operate to hold the fruit in its passage on the conveyor. This arrangement is for the purpose of delivering three columns of fruit into the extracting chamber B. There are partitions 31 which divide the interior of the conveyor into three compartments. The fruit is delivered in the delivery hopper 17 in tube 1 by means of a chute 32 to which fruit is fed by a conveyor, indicated generally by the numeral 33, driven in synchronism with the conveyor 3 by a drive chain 34, which in turn is driven by a sprocket member 35 mounted on a shaft 36, which carries the sprockets 12. Thus the fruit delivered through the hopper 17 falls into the three rows above described, and occupies a position on the fingers 28 such as is indicated in Figure 8.

The motion of the conveyor is as indicated by arrows in Fig. 1, and the fruit falls into a liquid gas seal 37 formed by water lying in the lower end of the conveyor A (see Figs. 1 and 2). The fruit rests on the pairs of fingers 28 in the position indicated in the top row in Figs. 2 and 8, until the fruit passes into the water seal 37, where it is carried through by the conveyor 3, as indicated in Fig. 2. After passing through the seal it is picked up by the pairs of fingers 28 and from then on occupies a position in the angle formed by the fingers 28, as indicated in Fig. 2, and in dotted lines in Fig. 9.

The fruit passes from the input chute 17 down the tube 1, through the return section 6 up through the tube 2, and is delivered into input chute 18 which delivers into the extracting section B of the mechanism. In Fig. 9 I have indicated the fruit leaving the fingers (see top row) and passing into trough sections 38 within the delivery chute 18. From thence, as previously described, the fruit passes to the cutting knives and to the extracting mechanism, which is not shown and which lies within the extracting section B of the mechanism. This extracting mechanism is driven by operating gears 39, indicated in dotted lines in Fig. 1, which are in turn driven by a gear wheel 40, shown partially in dotted lines, which is driven by a sprocket 41 through a chain 42 which passes over a sprocket 41' on the counter-shaft 24.

The arrangement is such in the delivery conveyor construction, indicated generally by the numeral A, that when the assembly hatches 16, 19 and 20 are closed, the input hopper 17 closed by a closure plate 43 which can be bolted in place, then the whole input conveyor assembly can be filled with water or inert gas, as will be later described.

The extracting section B of the mechanism is likewise liquid and gas-tight. The section 9 which projects downwardly from the conveyor tubing 2 provides a liquid seat 44, as indicated in Figs. 5 and 1. The liquid seal 37 at the lower end of the input conveyor A has a water inlet pipe 45 and a water outlet pipe 46 with suitable valves therein (not shown). The liquid seal 44 has a water outlet pipe 47, and a water inlet pipe 48.

Leading outwardly and downwardly from the extracting section B of my device are peel discharge chutes 50, in the sides of which are clean out hatches 51. Each chute 50 has a delivery end 52 which is adapted to lie below the water level in vats 54. Each vat 54 is connected with a trough construction 56 in which are adapted to travel flights 57 of the output conveyor mechanism C.

By having the delivery chutes deliver the peels from the extracting chamber B below water or liquid level, access of oxygen to the extracting mechanism and the extracted juices is prevented. The whole mechanism is adapted to be filled with inert gas, such as carbon dioxide or nitrogen, to prevent oxidation of the extracted juices at any time either during extraction or after extraction. The purpose of the construction is to prevent access of oxygen at any time to the juices from the disruption of the fruit until the juices are delivered and sealed in the containers.

I have provided a gas inlet 100 controlled by a suitable valve (not shown) for introducing an inert gas into the interior of the input conveyor, the extracting mechanism B and the peel discharge chute. The extracting mechanism B is provided with a bottom which slopes towards the center, as indicated at 101, into which the juice is discharged through a collection pipe 102, from whence the juice may be taken to the filling operation for filling containers with the extracted juice.

In order to remove all of the oxygen in the apparatus at the start of the operation, I fill the interior of the apparatus with water. I close all of the assembly hatches and the input hatch 17 through which the oranges or other fruit or vegetables to be extracted are fed to the machine, and the discharge ends of the chutes 50. With all of these hatches closed, water can be introduced through the water inlet pipe 45 in the liquid seal 37, or through water inlet 48 in the liquid seal 44. It is to be understood that the valves in the outlet pipes 46 and 47 are closed to prevent egress of water or other fluid which may be used for the machine. Water is then allowed to flow into the machine and fill it. That is to say, the input apparatus A is filled with water; the downwardly projecting section 9 of the input conveyor is filled with water; the extracting section B is filled, and the peel output ducts 50 are filled. Likewise the vats 54 and the trough 56 are filled with water. Now the whole machine is filled with water and gas can be introduced through the gas line 100. This gas may be carbon dioxide, or nitrogen, or a mixture of both, or other suitable inert gas which will prevent oxidation of the extracted juice. Water is let out of the machine as the gas fills the machine. The liquid seals 37 and 44 at the upper and lower ends of the elevating conveyor are of course kept filled with liquid. Likewise the vats 54 and trough 56 are kept filled with water. Now the entire interior of the machine is filled with a non-oxidizing or inert gas. Closure plate 43 of the feeding hopper to the elevating conveyor is removed. The closure plates for the bottom of each of the discharge chutes 50 are also removed.

Oranges, or other citrus fruit, are fed by the conveyor 33 into the chute 54 and into the input hopper 17 of the elevating conveyor A. All three of the sections of the elevating conveyor are filled, and the flights of the conveyor cause the fruit to pass down through the water seal 37, from whence they are conducted upwardly, as indicated by the arrow in Fig. 1, and three rows of fruit are dumped into the hopper 18 that feeds the slicing and juice extracting mechanism, the rows of fruit rolling downwardly in the troughs of sections 38 of the input hopper 18 to the cutting and extracting mechanism in section B of the machine. Each of the fruit is halved by cutting knives (not shown), and the juice is extracted by mechanism (not shown), the juice flowing to the sloping floor 101 of the extracting section B of the machine, from whence it can be allowed to flow out to fill receptacles.

It is to be noted that no oxygen can contact the fruit or the juice in its passage through the machine from the time the fruit enters through the liquid seal 37 of the elevating conveyor A until the extracting operation is completed. Access of oxygen is prevented through operation of the liquid seals 44 and 37 at the top and bottom of the elevating conveyor A, and likewise the liquid seals formed at the bottom of the peel discharge chutes 50 prevent access of oxygen into the extracting chamber B.

Further the delivery conveyor mechanism forms not only a conveyor, but a water seal, the conveyor having water seals at both top and bottom. The conveyor itself comprises a double duct, one half of which is sealed from the atmosphere, the other half of which being open to the atmosphere. The flights on the conveyor belt and the conveyor construction are such as to center the fruits in position with respect to the cutting and squeezing mechanism. Different sizes of the fruit are held centered and thus the mechanism does not have to operate on a uniform size of fruit. It is to be noted that the duct sections 38 of the input duct 18 to the extracting mechanism B have a sloping bottom, which holds the fruits centered (see Fig. 9).

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A conveying apparatus for fruits and vegetables comprising a pair of substantially parallel tubes joined at one end by a U-shaped connection and at the opposite end with an angularly disposed connection, liquid seals in said U-shaped connection and angularly disposed connection, an endless conveyor within said parallel tubes and movable through said liquid seal, an inlet in one of said tubes between said seals, an outlet in the other tube between said seals, and means operatively connected to said conveyor for propelling the fruit and vegetables from the inlet to the outlet.

2. A conveying apparatus for fruits and vegetables comprising a pair of substantially parallel tubes joined at one end by a U-shaped connection and at the opposite end with an angularly disposed connection, liquid seals in said U-shaped connection and angularly disposed connection, an endless conveyor within said parallel tubes and movable through said liquid seals, an inlet in one of said tubes between said seals, an outlet in the other tube between said seals, and fingers carried by said conveyor for propelling the fruit and vegetables from the inlet to the outlet.

3. A conveying apparatus for fruits and vegetables comprising a pair of substantially parallel tubes joined at one end by a U-shaped connection and at the opposite end with an angularly disposed connection, liquid seals in said U-shaped connection and angularly disposed connection, an endless conveyor within said parallel tubes and movable through said liquid seals, an inlet in one of said tubes between said seals, an outlet in the other tube between said seals, a plurality of longitudinal channels in each of said tubes, and fingers carried by said endless conveyor and projecting into the channels for propelling the fruit and vegetables therethrough from the inlet to the outlet.

4. A conveying apparatus for fruits and vegetables comprising a pair of substantially parallel tubes joined at one end by a U-shaped connection and at the opposite end with angularly disposed connection, liquid seals in said U-shaped connection and angularly disposed connection, an endless conveyor within said parallel tubes and movable through said liquid seals, an inlet in one of the tubes adjacent to the liquid seal in the U-shaped connection, an outlet in the other tube between said seals, and means operatively connected to said conveyor for propelling the fruit and vegetables from the inlet to the outlet.

5. A conveying apparatus for fruits and vegetables comprising a pair of substantially parallel tubes disposed at an angle from the vertical and joined at one end by a U-shaped connection and at the other end with an angularly disposed connection, liquid seals in said U-shaped connection and angularly disposed connection, an endless conveyor within said parallel tubes and movable through said liquid seals, an inlet in one of said tubes between said seals, an outlet in the other tube between said seals, and means operatively connected to said conveyor for propelling the fruit and vegetables from the inlet to the outlet.

6. A conveying apparatus for fruits and vegetables comprising a pair of substantially parallel tubes joined at one end by a U-shaped connection and at the other end with an angularly disposed connection, liquid seals in said U-shaped connection and angularly disposed connection, an inlet in one of said tubes between the liquid seals, an outlet in the other tube between said liquid seals, and propelling means for the fruit and vegetables within said tubes and movable through said liquid seals for moving the fruit and vegetables from the inlet to the outlet.

7. A conveying apparatus for fruits and vegetables comprising a pair of substantially parallel tubes joined at one end by a U-shaped connection and at the opposite end with an angularly disposed connection, an endless conveyor within said parallel tubes and movable through said liquid seals, an inlet in one of the tubes adjacent to the liquid seal in the U-shaped connection, an outlet in the other tube between said seals, a plurality of longitudinal channels in each of said tubes, fingers carried by said endless conveyor and projecting into the channels for propelling the fruit and vegetables from the inlet to the outlet.

RONALD B. McKINNIS.